United States Patent [19]
Margulis

[11] Patent Number: 5,840,262
[45] Date of Patent: Nov. 24, 1998

[54] PROCESS FOR THE MANUFACTURE OF PURE LEAD OXIDE FROM EXHAUSTED BATTERIES

[75] Inventor: Efim Margulis, Haifa, Israel

[73] Assignee: Margulead Ltd., Haifa-Bay, Israel

[21] Appl. No.: 597,821

[22] Filed: Feb. 7, 1996

[30] Foreign Application Priority Data

Jan. 14, 1996 [IL] Israel ........................................ 116753

[51] Int. Cl.$^6$ .................................................. C01G 21/00
[52] U.S. Cl. ................................ 423/92; 423/98; 423/619
[58] Field of Search ................................ 423/92, 98, 619

[56] References Cited

U.S. PATENT DOCUMENTS

| | | | |
|---|---|---|---|
| 1,148,062 | 7/1915 | Tucker et al. | |
| 1,915,724 | 6/1933 | Finkelstein | 423/619 |
| 4,220,628 | 9/1980 | Striffler, Jr. et al. | 423/92 |
| 4,222,769 | 9/1980 | Okuda et al. | 75/120 |
| 4,460,442 | 7/1984 | Ducati | 423/98 |
| 4,769,116 | 9/1988 | Olper et al. | 204/114 |
| 5,173,277 | 12/1992 | Montgomery et al. | 423/98 |
| 5,211,818 | 5/1993 | Moure, Jr. et al. | 204/114 |

FOREIGN PATENT DOCUMENTS 36 37 270  5/1987  Germany .

*Primary Examiner*—Steven Bos
*Attorney, Agent, or Firm*—Lowe, Price, LeBlanc & Becker

[57] ABSTRACT

The present invention relates to an improved process for producing lead oxide in a pure state from a spent paste resulting from exhausted acid batteries. The spent paste is first calcined and desulfurized, then leached by a concentrated solution comprising an alkali hydroxide at a temperature above 100° C. The separated solution is contacted with a ketone resulting in a suspension from which the α-lead oxide constituent is recovered. The solutions of alkali and ketone are recycled in the process. The preferred alkali constituents are selected from sodium hydroxide or potassium hydroxide, preferably containing also a small amount of sulfate of the respective alkali metal of the hydroxide used.

6 Claims, 1 Drawing Sheet

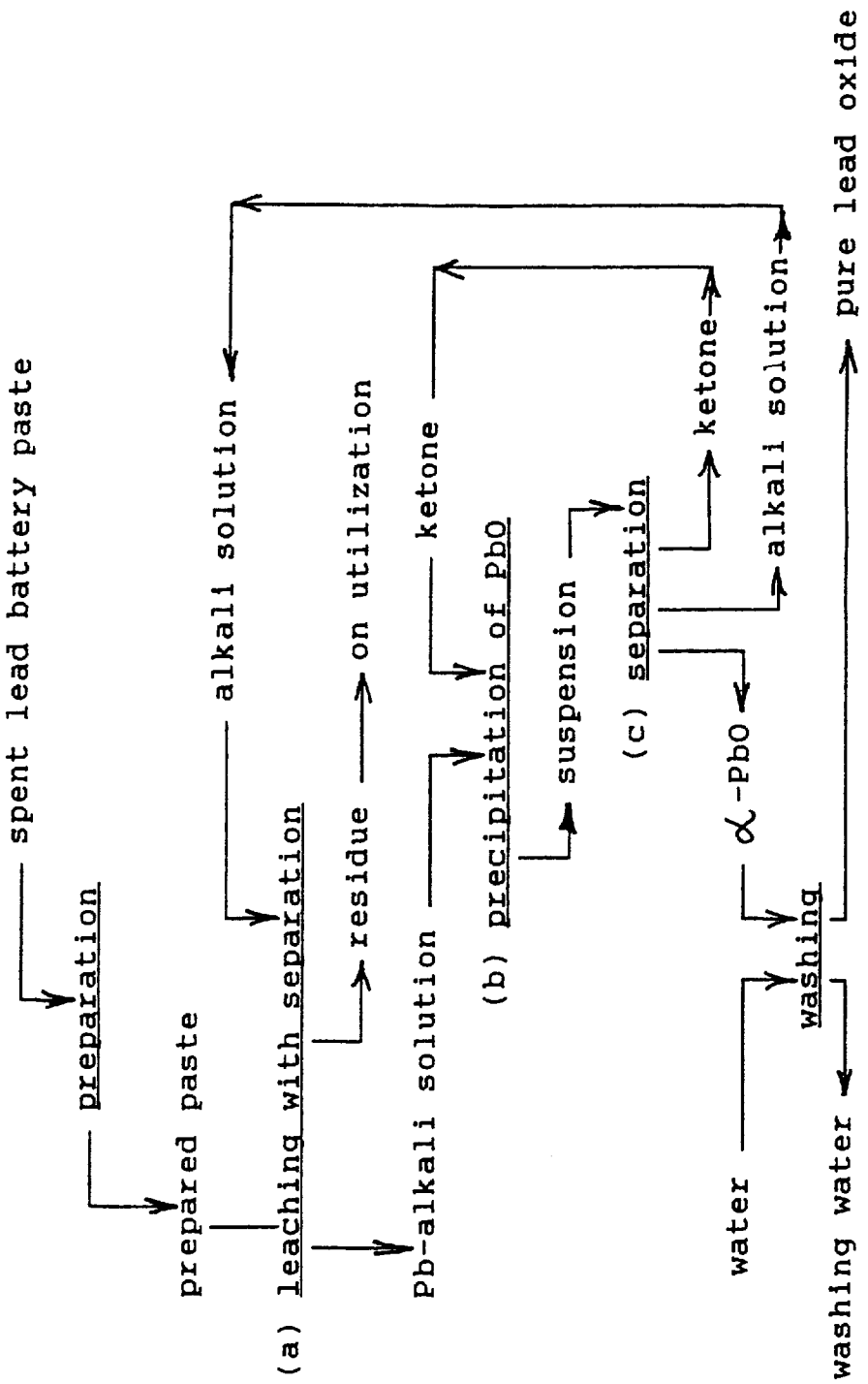

PROCESS FOR THE MANUFACTURE OF PURE LEAD OXIDE FROM EXHAUSTED BATTERIES

FIELD OF THE INVENTION

The present invention relates to an improved process for the recovery of lead from exhausted batteries. More particularly, the invention relates to an improved process for the recovery of lead as pure lead oxide from a spent paste obtained from exhausted lead-acid batteries and resolves the environmental and pollution problems associated with said processes.

DESCRIPTION OF THE PRIOR ART

The recovery of lead from exhausted lead-acid batteries was extensively investigated during the last sixty years and is currently performed in large scale. The acute problems of pollution contributed to an increased interest, in recent years, in providing new methods which would lower the pollution and environmental problems of currently known pyrometallurgical processes.

In 1915, in the U.S. Pat. No. 1,148,062, a process is described for the recovery of lead from exhausted batteries. According to this patent, extracted spent battery pastes are transformed into lead oxides by calcination and desulfurization. However, the oxides produced are not of high purity.

According to the U.S. Pat. No. 4,222,769, an extracted spent battery paste is desulfurized and then transformed into metallic lead by a roasting in the presence of a carbon reducing agent.

In the U.S. Pat. No. 4,769,116, a paste is obtained from exhausted lead-acid batteries and treated with sodium hydroxide to produce a solution of sodium sulfate and a desulfurized paste. The pure metallic lead is further recovered from the desulfurized paste by electrowinning.

According to the German Patent No. 3,637,270, the lead constituent is recovered from used batteries by extraction with an aqueous solution of a mineral acid, followed by a treatment with a solution of hydrogen peroxide, thus obtaining $Pb^{++}$ ions. A particular advantage attributed to this method is the high recovery of lead and the use of non-toxic reagents.

In a relatively recent patent, U.S. Pat. No. 5,211,818, the paste sludge resulting from the exhausted batteries is treated with a solution of ammonium sulfate and the metallic lead constituent is recovered by electrowinning.

As can be noticed from the brief review, in most of the prior references, the recovered lead from exhausted batteries is in its metallic form and, consequently, has to be further converted to the respective oxides according to the respective market requirements.

It is an object of the present invention to provide an improved process for the recovery of the lead constituent from a paste obtained from exhausted batteries. It is another object of the present invention to provide an improved process for producing pure lead oxide from a paste obtained from exhausted batteries, without producing hazardous materials and polluting gases. It is still another object of the present invention to provide an economical process for obtaining pure lead oxide from a paste resulting from exhausted batteries.

SUMMARY OF THE INVENTION

The invention relates to an improved process for producing lead oxide in a pure state from a spent paste, previously calcined and desulfurized, which comprises the steps of:

(a) leaching of the calcined and desulfurized spent paste into a concentrated alkali solution which is heated to a temperature of about 100° C. at atmospheric pressure and separating the resulting solution from the residue;

(b) precipitating the lead oxide from said solution by adding a volatile ketone; and (c) separating the precipitated lead constituent from the suspension and washing to produce a very pure α-lead oxide, while recycling the alkali solution and ketone in the process.

According to a preferred embodiment, the alkali solution used in step (a) is selected from sodium hydroxide or potassium hydroxide, containing a small amount of sulfate and the most preferred ketone is selected from dimethyl ketone or methylethyl ketone.

BRIEF DESCRIPTION OF THE DRAWING

FIG. 1. The process for converting spent pastes of lead-acid batteries into pure lead oxide is depicted.

DESCRIPTION OF THE PREFERRED EMBODIMENTS

The invention will be hereafter described in a detailed manner, in conjunction with the flow-sheet as given in the attached FIG. 1.

In the first step, the previously calcined and desulfurized spent paste is contacted with a concentrated solution of sodium hydroxide or potassium hydroxide, preferably at a concentration of between 40% to 70% by weight and optionally containing between 30 to 45 g of sodium or potassium sulfate per liter of said solution. The slurry is filtered to obtain a clear filtrate containing the lead oxide. It is found that the presence of a small amount of sulfate, such as sodium sulfate or potassium sulfate, has a beneficial effect on the purity of the lead oxide product.

In the second step, a volatile ketone is added to the filtrate, which causes a rapid evaporative cooling of the filtrate to a temperature in the range between 50° C. to 75° C., thus producing a suspension of the lead oxide. Although the ratio between the ketone to the alkali solution containing the lead oxide is not very critical, the most preferred weight ratio is between 0.1 to 0.6, to be selected according to the temperature of the filtrate and the type of ketone as well as the extent of agitation.

Finally, in the last step, the suspension is filtered and the precipitated lead oxide is washed by water, thus obtaining a pure α-lead oxide containing less than 0.004% impurities, which generally consists of antimony, iron, barium and copper. The two separated liquid phases, i.e. the alkali solution and the respective ketone are recycled in the process.

A particular advantageous feature of the process is the short period of time required for the entire cycle, such time taking only about 45 to 60 minutes.

The invention will be hereafter illustrated by the following Examples, being understood that these Examples are presented only for a better understanding of the invention and without imposing any limitation, the process being covered by the attached claims.

In the Examples, the concentrations are given by weight percentages unless otherwise stated.

EXAMPLE 1

An amount of 179.5 g of paste, obtained from exhausted acid batteries after being calcined and desulfurized, was leached by 1000 cc of a solution containing 964 g of sodium hydroxide and 36 g of sodium sulfate and heated to about 130° C.

After separation from the slurry, the hot alkaline solution was introduced into a vessel provided with a reflux condenser and a mixer, to which acetone was added at a ratio of acetone to alkali lead solution of 0.25 (by weight). The volatilized acetone which condensed in the condenser, returned to the vessel while the final temperature therein dropped to about 57° C.

The precipitated lead oxide was filtered off, washed by tap water and found to contain only a small amount of impurities, mainly antimony, barium, iron and copper. The used acetone and alkali solution, present as distinct phases, were separated and recycled to the respective steps of the process. It was found that 176 g of a precipitated α-lead oxide was in its tetragonal form, from the one liter of the alkali solution.

EXAMPLE 2

The experiment as in Example 1 was repeated using the same paste and the same concentration of the sodium hydroxide, but the temperature during leaching was only 110° C. An amount of 88 g of the paste was leached by 1000 cc of the alkali solution containing also 29 g of sodium sulfate.

The solution was contacted with acetone (the ratio of acetone to alkali being 0.25 by weight). The precipitated product consisted of 85.6 g of α-PbO of very high purity with only 0.004% extraneous cations, mainly: iron, antimony, barium and copper.

I claim:

1. A process for producing lead oxide in a pure state from a spent paste obtained from exhausted lead-acid batteries, which comprises the steps of:

(a) leaching calcined and desulfurized spent paste with an aqueous concentrated solution comprising an alkali hydroxide at a temperature of above 100° C., and separating the solution from the residue;

(b) precipitating lead oxide from the solution obtained in step (a), by adding a volatile ketone, and (c) separating from the resulting suspension the lead oxide, thus producing after washing a pure α-lead oxide, the alkali solution and ketone being recycled to the process.

2. The process according to claim 1, wherein the alkali solution used in step (a) is selected from the group consisting of sodium hydroxide and potassium hydroxide.

3. The process according to claim 1, wherein the solution used in the leaching contains sodium sulfate or potassium sulfate.

4. The process according to claim 1, wherein the concentration of the alkali solution used in said leaching is between 40% to 70% by weight.

5. The process according to claim 1, wherein the ketone used in step (b) is selected from dimethyl ketone and methyl-ethyl ketone.

6. The process according to claim 5, wherein the weight ratio of ketone to the alkali solution is between 0.1 to 0.6.

* * * * *